United States Patent

[11] 3,607,677

[72] Inventors Irving W. Wolf;
Andre A. Jaecklin, both of Palo Alto, Calif.
[21] Appl. No. 508,108
[22] Filed Nov. 16, 1965
[45] Patented Sept. 21, 1971
[73] Assignee Ampex Corporation
Redwood City, Calif.

[54] METHOD OF MAKING A THIN FILM MEMORY
3 Claims, 3 Drawing Figs.

[52] U.S. Cl. .......... 204/15,
204/43, 340/174 TF, 340/174 SR
[51] Int. Cl. .......... C23b 5/48,
C23b 5/32, G11b 5/00
[50] Field of Search .......... 340/174
TF, 174 SR; 204/15, 43

[56] References Cited
UNITED STATES PATENTS

| | | | |
|---|---|---|---|
| 3,297,418 | 1/1967 | Firestone et al. | 204/43 |
| 3,328,270 | 6/1967 | Matsushita | 204/15 |
| 3,392,053 | 7/1968 | Olson et al. | 204/12 |
| 3,417,385 | 12/1968 | Wolf | 340/174 |
| 3,427,603 | 2/1969 | Wolf et al. | 340/174 |
| 3,213,431 | 10/1965 | Kolk, Jr. et al. | 340/174 |
| 3,230,515 | 1/1966 | Smaller | 340/174 |
| 3,366,937 | 1/1968 | Fuller | 340/174 |

*Primary Examiner*—John H. Mack
*Assistant Examiner*—T. Tufariello
*Attorney*—Robert G. Clay

ABSTRACT: A thin film storage memory and method of fabrication, wherein a high coercive force film is deposited as a separate layer on a low coercive force film, in a selected pattern as determined by a masking, coating of an electrically nonconductive material. The invention method is relatively simple due to the invention structure.

PATENTED SEP 21 1971 3,607,677

IRVING W. WOLF &
ANDRE A. JAECKLIN
INVENTORS

BY Robert G. Clay

ATTORNEY

METHOD OF MAKING A THIN FILM MEMORY

The present invention relates to thin film memories and their method of manufacture.

The formation of unwanted edge domains in the boundary of magnetically "soft," i.e., low coercive force thin films of the order of 2 oersteds, by demagnetizing fields has been a fundamental problem in providing thin film memory devices. In applications where the motion of domain walls is to be confined to certain prescribed paths this effect must be eliminated because nucleation of new domains provides misinformation. To this end, various techniques and film constructions have been developed which utilize in general a soft film window to define the region of interest wherein information is stored. Such constructions have generally utilized a high coercive force, i.e., "hard," film guard strip, of the order of 20 oersteds, surrounding the soft film wherein the hard film strip suppresses the formation of the unwanted edge domains. This high coercive force guard strip in one instance is prepared by masked evaporation which provides a film configuration having tapered edges, wherein the coercive force, $H_c$, varies inversely with thickness. In other embodiments, $H_c$ is controlled by alloy composition or by controlling the surface roughness of the substrate surrounding the desired area. Such prior art techniques and thin film constructions generally lack good edge definition or are very difficult to fabricate.

It is accordingly an object of the present invention to provide a novel thin film storage memory and method of fabrication utilizing a composite layer configuration of high and low coercive force films to constrain domain walls to localized regions within the film memory, while lending itself to relatively simple fabrication procedures. To simplify the description high and low coercive force films are hereinafter termed "-hard" and "soft" films, respectively.

Other objects and advantages will be apparent from the specification taken in conjunction with the drawings wherein.

Briefly, in accordance with the invention, the desired portion of a soft film is masked with a nonconductive coating, and a hard film is electroplated as a separate and distinct layer onto the remaining exposed portions of the soft film. This provides a soft film window configuration wherein information may be stored, having a preselected design as defined by a surrounding hard film. The hard boundary of the composite film memory provides a barrier to domain walls which move in the soft film, and simultaneously suppresses the formation of edge domains. Due to the particular layered configuration, fabrication of the above-described, thin film storage memory can be readily accomplished utilizing the versatile and relatively simple photo-resist processes in the particular manner described hereinafter.

Figure 1:
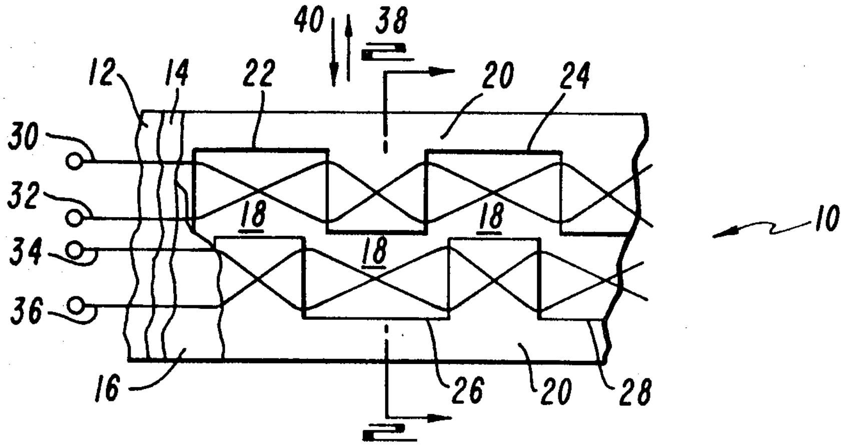
FIG. 1 is a top view of a portion of composite thin film memory of the present invention, further depicting coils for applying a magnetic field thereto.
Figure 2:
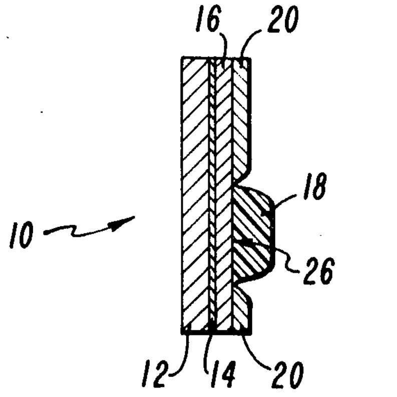
FIG. 2 is a cross-sectional view taken along lines 2—2 of FIG. 1 showing the composite film construction.

Referring to FIGS. 1 and 2, a thin film memory 10 is formed utilizing a glass substrate 12 upon which is sputtered a layer of gold 14. A low coercive force magnetic film 16 is electroplated onto the gold layer 14 to form a "soft" film of the type described for example in copending U.S. Pat. applications Ser. No. 387,427 filed Aug. 4, 1964 in the name of Irving W. Wolf and now U.S. Pat. No. 3,417,385, and Ser. No. 387,426 filed Aug. 4, 1964 in the names of Irving W. Wolf and Andre A. Jaecklin and now U.S. Pat. No. 3,427,603. In accordance with the invention, portions of the soft film are then masked with a nonconductive coating 18 in the form of the pattern desired. A "hard" magnetic film 20 is thereafter electroplated or otherwise deposited onto the portions of the soft film not masked by the coating 18, to provide a desired pattern of exposed soft film windows within the composite thin film memory 10.

As exemplified in FIGS. 1 and 2 the thin film storage memory 10 is formed in a particular embodiment, with a plurality of magnetic thin film sites 22–28 arranged in a multiple level, staggered array. As shown pictorially in FIG. 2, each level of sites 22, 24 and 26, 28 have disposed therealong coils 30, 32 and 34, 36 respectively, for applying a magnetic field thereto in a first preferred direction and a second preferred direction. In the particular embodiment of FIG. 2 wherein the coils extend generally in a horizontal direction the first preferred direction of magnetization is as indicated by arrow 38, and the second preferred direction is as indicated by arrow 40. It is to be understood that although rectangular-shaped sites with horizontally oriented coils are exemplified herein, there are various memory geometries and coil configurations with which the invention may be utilized. For example, the composite hard and soft film memory configuration of the invention can be formed to define a single elongated soft film window bordered by straight strips of hard film at either edge thereof, wherein the advantages of good edge definition and ease of fabrication processes can be realized. Such alternative arrangements are further exemplified and their operation is described in the two above-mentioned copending applications, and accordingly is not further disclosed herein.

Fabrication of the thin film memory 10 is performed by first electrodepositing a low coercive force film on the substrate 12, which can be formed of several types of material such as for example, glass, plastic and aluminum. Thereafter, the desired pattern, as depicted in the drawing, is obtained by depositing the nonconductive coating 18, utilizing for example various photoresist processes known in the art and exemplified by the Kodak photoresist process, as described in the Kodak Industrial Data Book, P-7, 1964, entitled "Kodak Photosensitive Resists for Industry." The masked soft film is then placed in an electrolytic solution having predetermined proportions of the combinations, cobalt, nickel and iron, cobalt and copper, or cobalt, nickel, iron and copper. The hard film 20 is thus deposited on the unmasked portions of the soft film by an electroplating process.

The following exemplify the basic proportions utilized in the above-mentioned electrolytic solutions:

1. Nickel 74% by weight
   Iron 18.5% by weight
   Cobalt 7.5% by weight
2. Cobalt approximately 60% by weight
   Copper approximately 40% by weight
3. Nickel approximately 74% by weight
   Iron approximately 18.5% by weight
   Cobalt approximately 7.5% by weight
   Copper approximately 1 to 5% by weight A further description of the electroplating process for deposition of the hard as well as soft films is found in the article "The Effect of Small Quantities of Copper of the Magnetic Properties of Electrodeposited Permalloys," I.W. Wolf, (Electric and Magnetic Properties of Thin Metallic Layers Conference) 1961, Palace of the Academy, Brussels.

The nonconductive coating 18 may be removed by means of the unusual developing process associated with the above-mentioned Kodak photoresist process, however the composite thin film memory 10 may be utilized with or without removal of the coating 18.

It has been found that an optimum value for the thickness of the hard film is of the order of 500 to 1,200 Å, and that of the soft film 500 to 1,500 Å. Too thin a hard film results in the lack of a barrier to the wall, while too thick a hard film results in the spontaneous forming of edge domains at the boundary There are, of course, optimum values of thickness for the films depending upon the type and proportions of the materials used in their formation.

Figure 3:
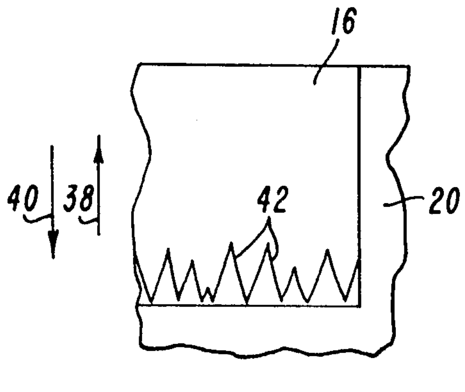
FIG. 3 is a view of a zigzag wall which was propagated along the easy axis of the soft film, depicting the arrest thereof at the hard film boundary of the invention.

The film characteristics were monitored with a hysteresigraph while details of the domain structure and the filed penetration or "punch-through" behavior, $H_{Pt}$, which defines the useful operating margin, where observed by means of the Kerr effect and Bitter patterns. Typical parameters for the soft films were, $H_c \simeq 2$ oersteds, $H_k$=6–15 oersteds; for the hard films, $H_c \simeq 20$ oersteds, $H_k$=15–20 oersteds; for the composite portion of memory 10 of the invention, $H_c$=6–15 oersteds, wherein $H_k$ is the induced anisotropy field, and $H_c$ is the coercive field. An asymmetric hysteresis loop was observed, indicating suppression of the edge domains. As shown in FIG. 3, a zigzag wall indicated by numeral 42, propagated along the easy axis of the soft film 16, was arrested with good edge definition at the composite barrier, i.e., the edge of the hard film 20. A substantial increase in field was required to cause the wall 42 to penetrate or "punch-through" into the composite film, thereby indicating the effectiveness of the composite film memory 10 in constraining domain walls.

We claim:

1. A process for fabricating a composite thin film memory comprising the steps of:

depositing a continuous low coercive force thin magnetic film on the surface of a substrate;

masking a select portion of the deposited low coercive force thin magnetic film with an electrically nonconductive coating of a predetermined pattern, wherein complementary portions of the low coercive force magnetic film are left exposed;

immersing the masked low coercive film in an electrolytic solution containing ions of a high coercive force magnetic material;

applying a selected amount of current to the immersed film during a selected interval of time to form a separate high coercive force magnetic film upon said exposed complementary portions of low coercive force magnetic film to define a selected pattern of low coercive force film corresponding to the predetermined pattern of the nonconductive coating, which selected pattern is defined by the separate layer of high coercive force magnetic film.

2. The process of claim 1 wherein the low and high coercive force thin magnetic films are deposited to thicknesses of 500 to 1,500 Angstroms and 500 to 1,200 Angstroms respectively.

3. The process of claim 2 wherein the low and high coercive force thin magnetic films are electrodeposited and the nonconductive coating is formed by a photoresist process.